United States Patent [19]
Von Hagel

[11] 4,177,906
[45] Dec. 11, 1979

[54] BLOW MOLDED PLASTIC BOTTLE AND PLASTIC CAP

[75] Inventor: Leo Von Hagel, North Massapequa, N.Y.

[73] Assignee: Maxcap Inc., New York, N.Y.

[21] Appl. No.: 911,277

[22] Filed: May 31, 1978

[51] Int. Cl.² ............................................. B65D 55/02
[52] U.S. Cl. ...................................... 215/252; 215/31; 215/329
[58] Field of Search .................. 215/31, 252, 329, 330

[56] References Cited
U.S. PATENT DOCUMENTS

| | | | |
|---|---|---|---|
| 2,965,256 | 12/1960 | Yochem | 215/329 |
| 3,229,841 | 1/1966 | Bailey | 215/31 |
| 3,298,415 | 1/1967 | Klygis | 215/320 X |
| 3,339,773 | 9/1967 | Stull | 215/329 |
| 3,727,784 | 4/1973 | Sargent | 215/329 |
| 3,902,621 | 9/1975 | Hidding | 215/252 |
| 3,980,195 | 9/1976 | Fillmore | 215/252 X |

Primary Examiner—Donald F. Norton
Attorney, Agent, or Firm—Abner Sheffer

[57] ABSTRACT

A milk bottle has an antitamper cap having a plug adapted to fit into the mouth of the bottle. The neck of the bottle is tapered toward the mouth and the cap has means for restraining the top of the neck to keep the mouth in good sealing contact with the plug when the cap is screwed on.

38 Claims, 41 Drawing Figures

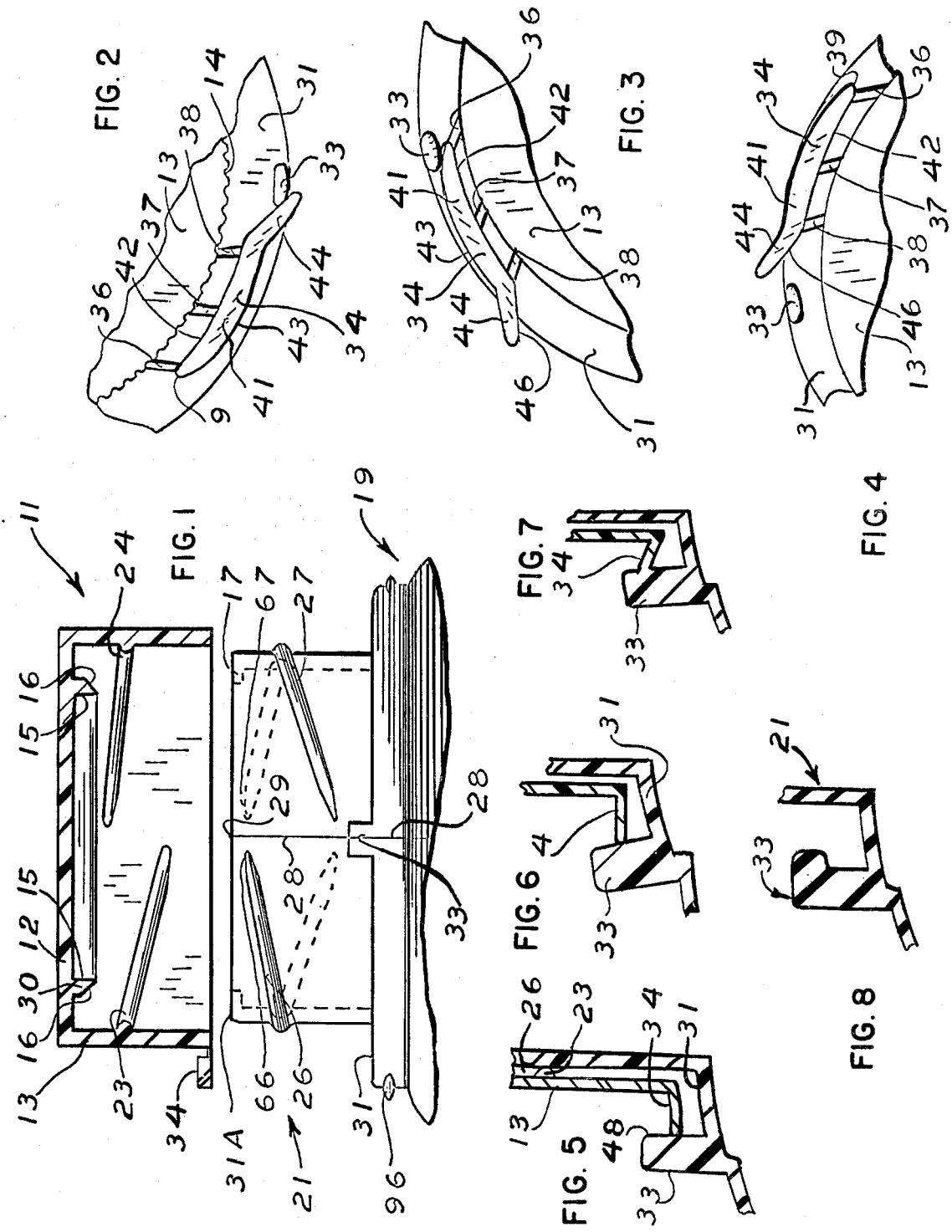

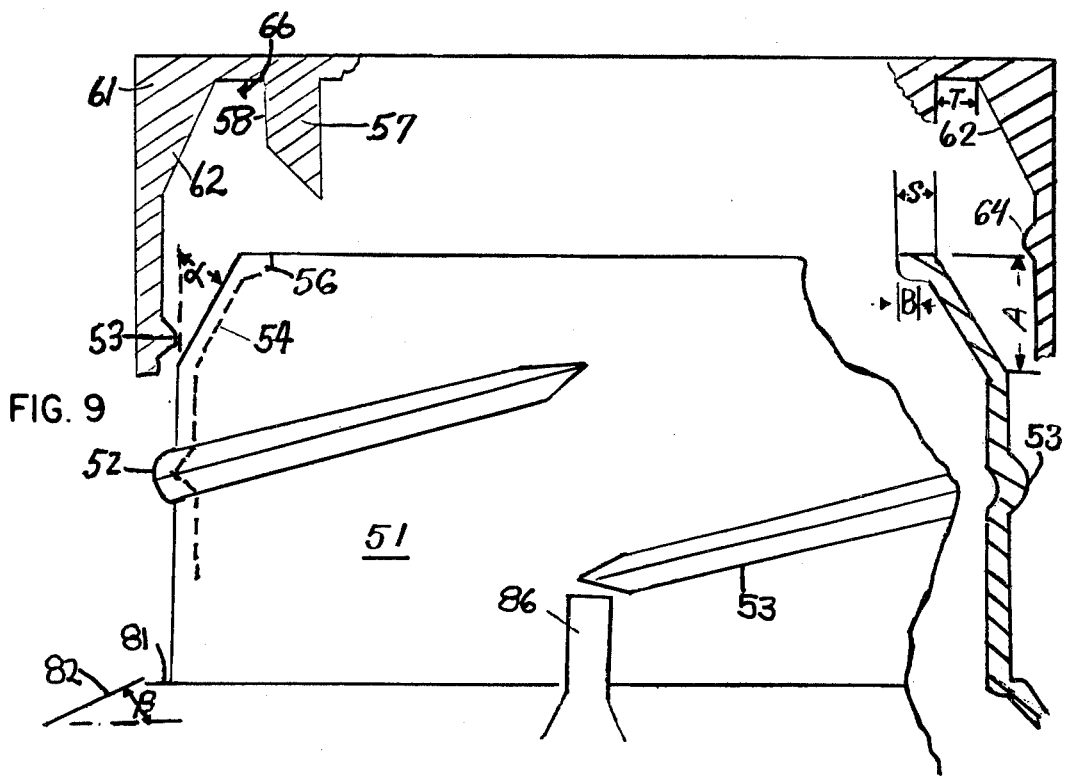
FIG. 9
FIG. 12  FIG. 10  FIG. 10A  FIG. 11  FIG. 11A
THREADS STRIPPING
FIG. 18
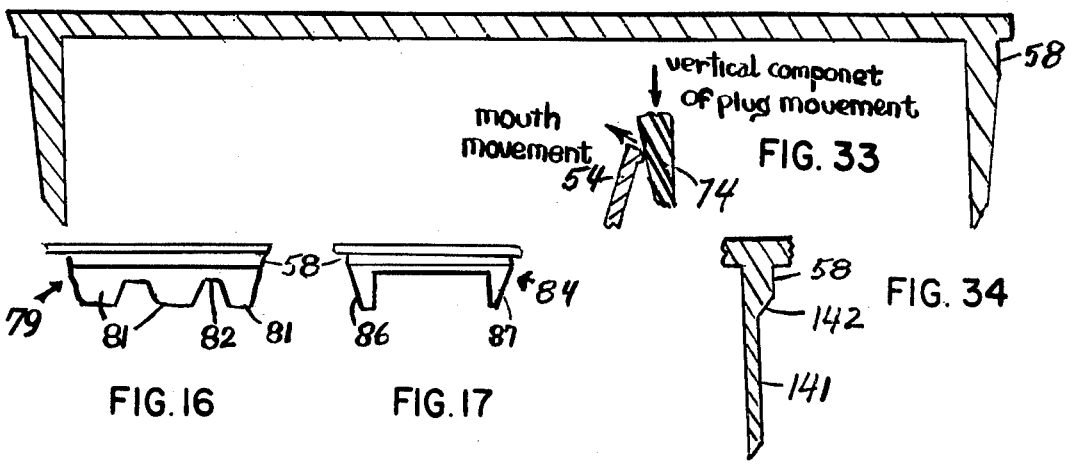
FIG. 16  FIG. 17  FIG. 33  FIG. 34

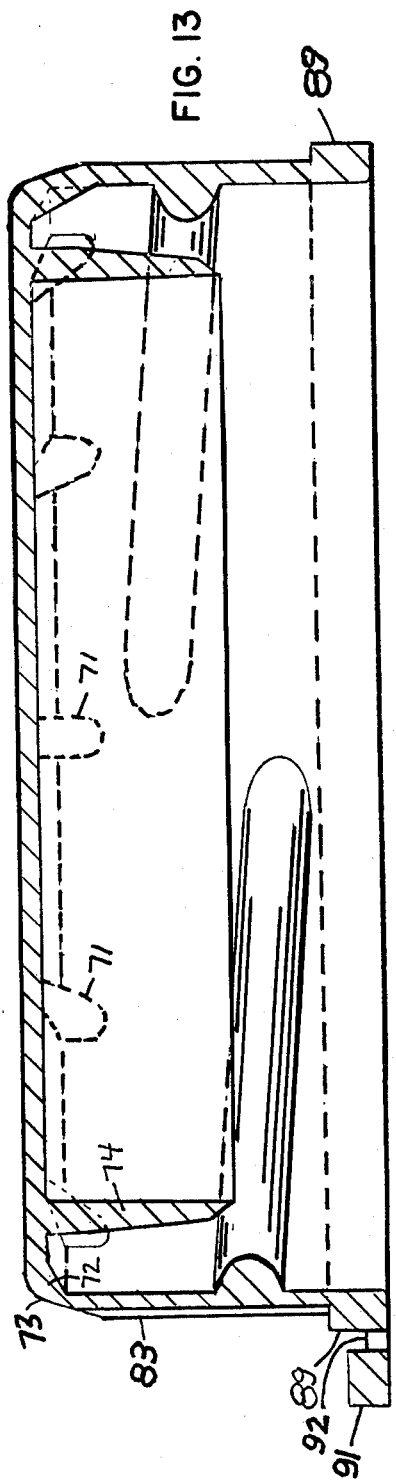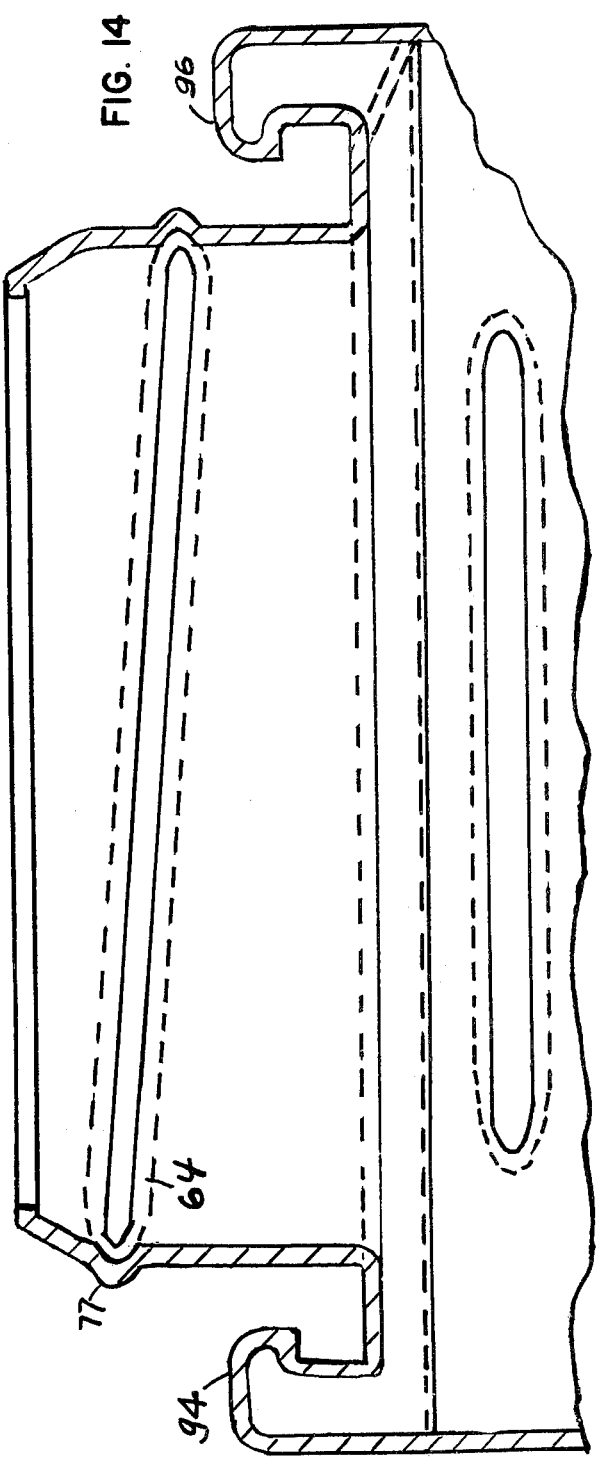

TYPICAL BUMPER SECTION

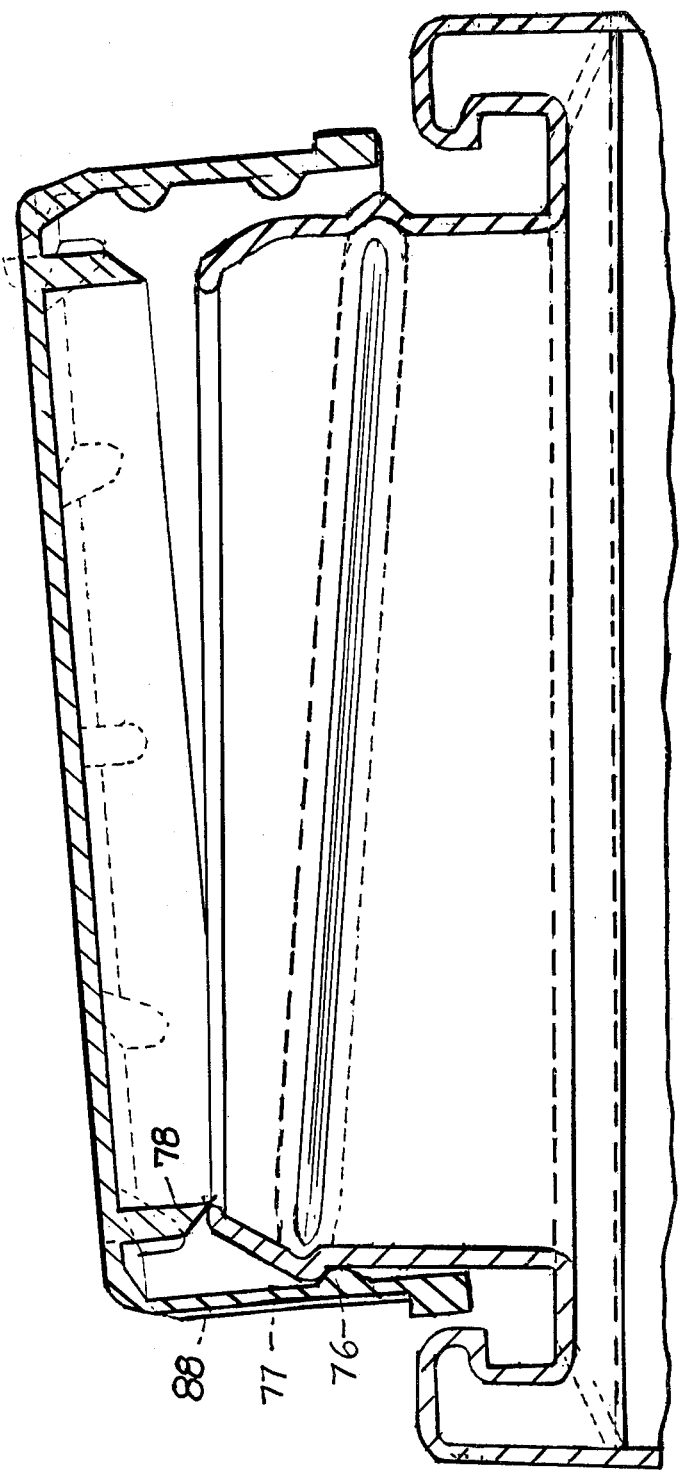

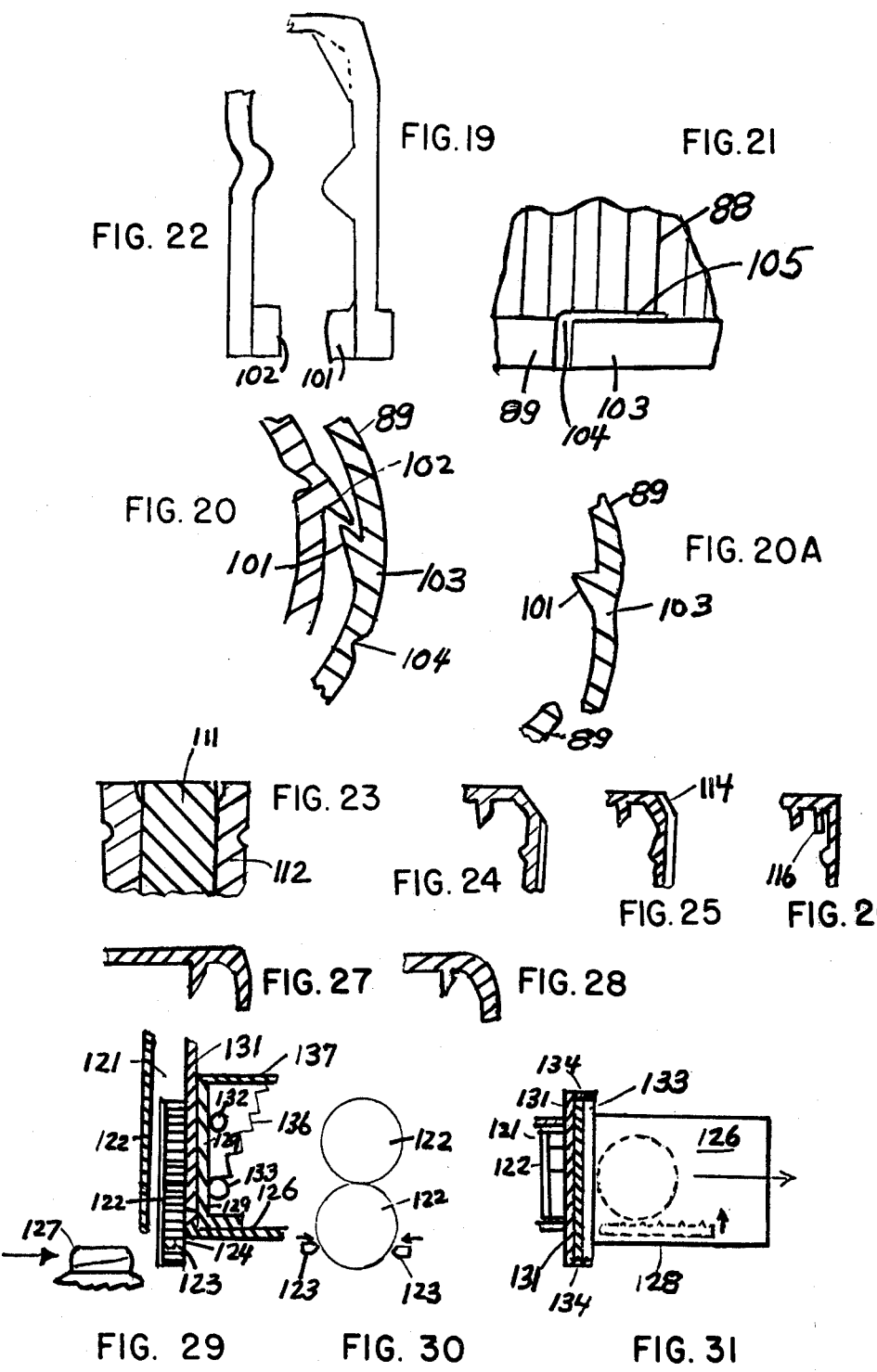

BLOW MOLDED PLASTIC BOTTLE AND PLASTIC CAP

This invention relates especially to a cap and bottle arrangement of the type described in Virog and Von Hagel U.S. Pat. No. 4,098,419 of July 4, 1978 whose entire disclosure is incorporated here by reference.

Certain embodiments of the invention are illustrated in the accompanying drawings in which FIGS. 1 to 8 illustrate, for comparison, the cap and bottle described in U.S. Pat. No. 4,098,419, FIG. 1 is a side view of the top of one form of plastic bottle in accordance with this invention and a cross sectional side view of a cap therefor, FIG. 2 is a top view of a portion of the cap, showing its antitamper tab and the relationship thereof to one of the lugs on the bottle, when the cap is first seated on the bottle, FIG. 3 is a view like FIG. 2 but at a later stage of the screwing on of the cap, FIG. 4 is a view like FIG. 3 after further movements of the cap, FIG. 5 is a cross sectional schematic view of portions of the cap and bottle, when the cap is in the position shown in FIG. 4, FIGS. 6 and 7 are cross sectional views showing relationships of tab and lug, FIG. 8 shows another lug configuration, FIG. 9 is a side view partly in cross section and partly broken away of one form of cap and bottle of this invention;

FIGS. 10, 10A, 11 and 11A are broken-away cross sectional side views of portions of caps and bottles; FIGS. 10 and 10A relate to one construction and FIGS. 11 and 11A relate to another construction.

FIG. 12 is a cross sectional side view of a portion of a skirt of a cap,

Figure 13A:
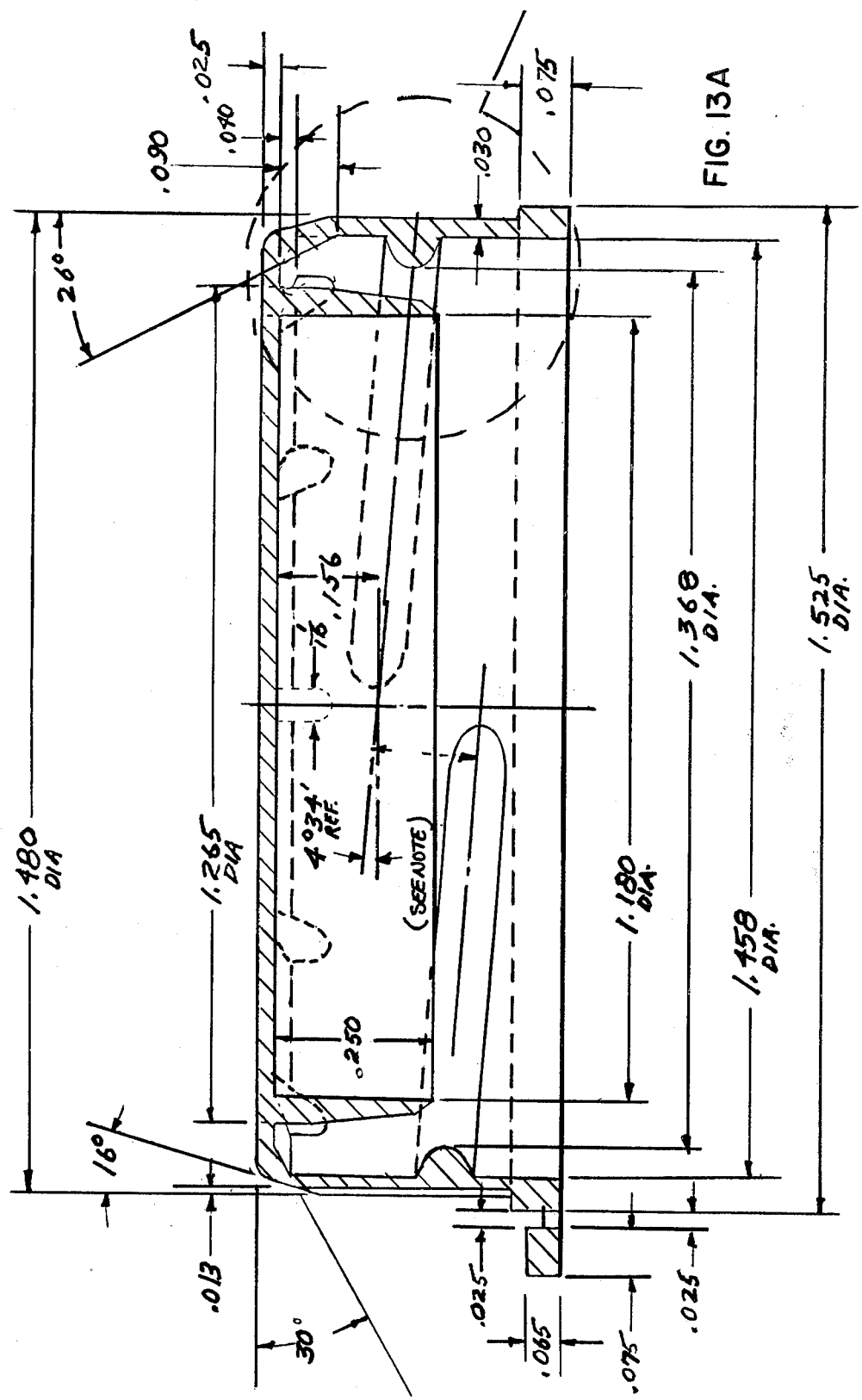
Figure 13B:
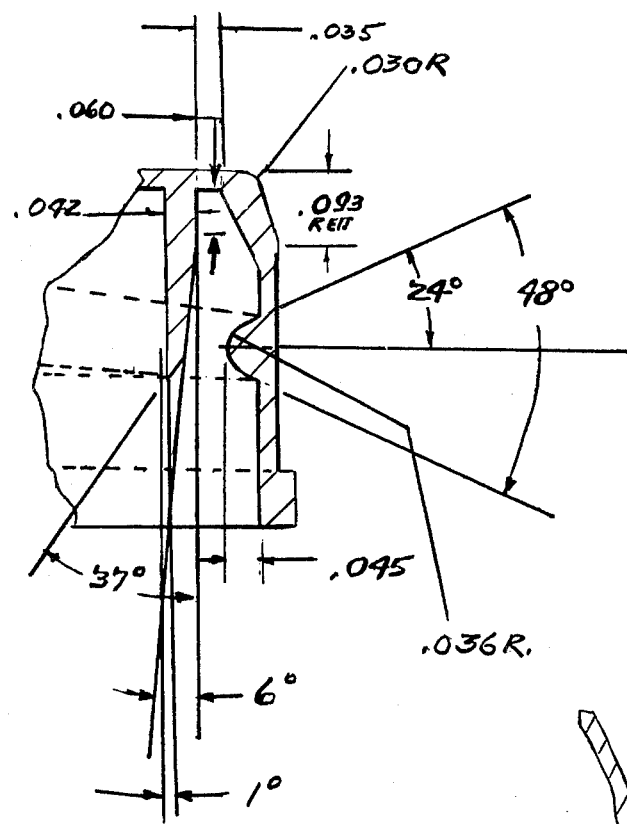
Figure 14B:
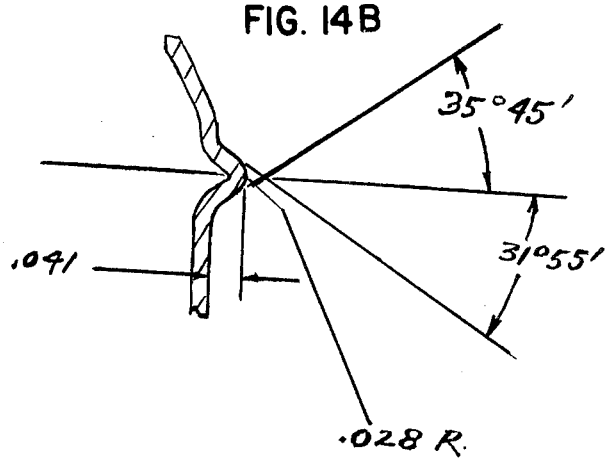
Figure 14C:
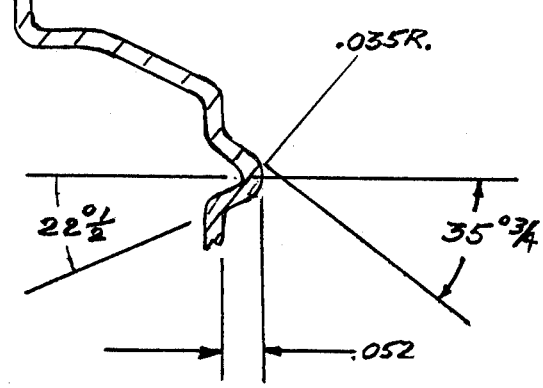
Figure 14A:
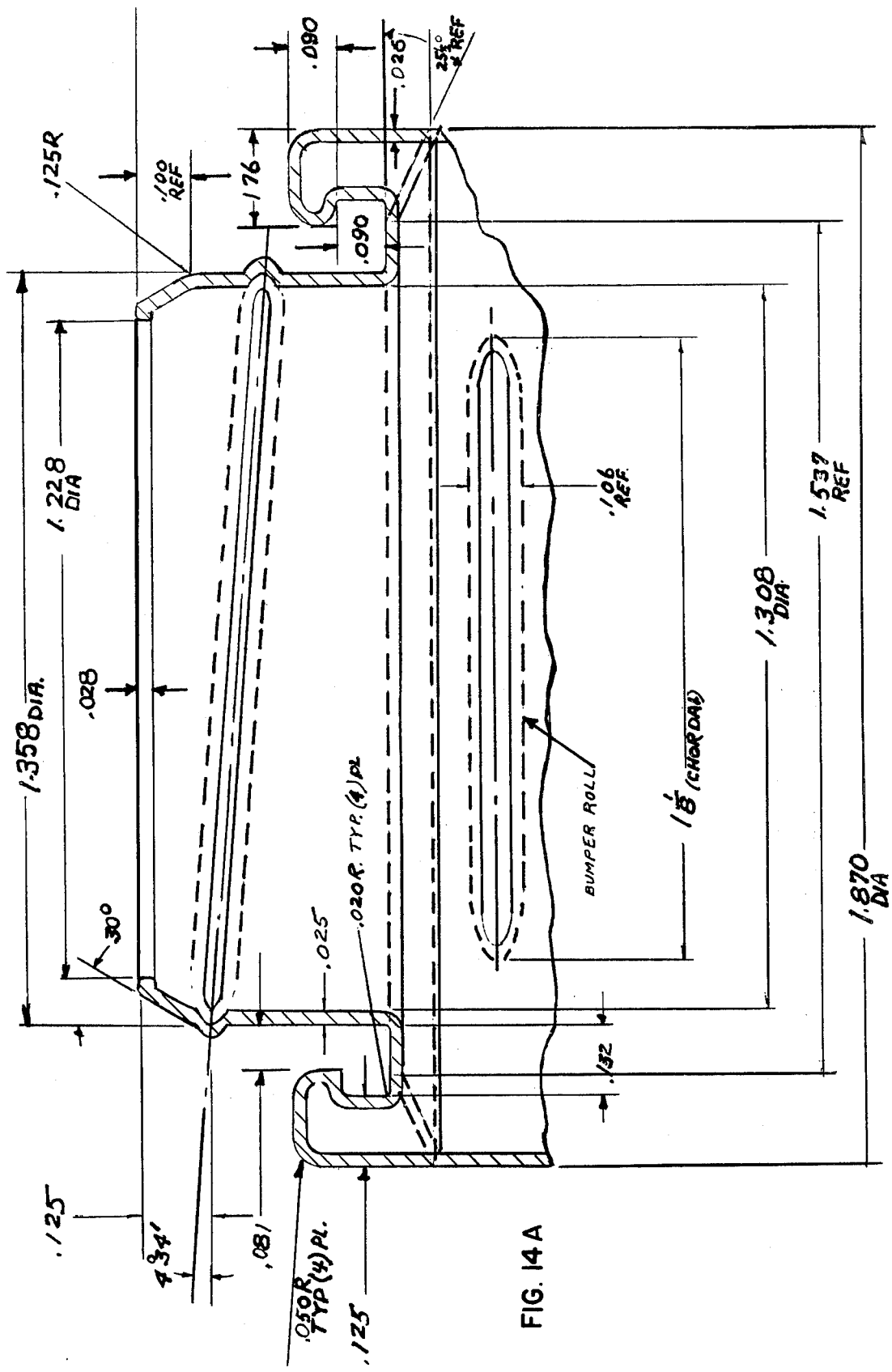

FIGS. 13 and 14 are cross sectional side views of a preferred form of cap (FIG. 13) and bottle neck (FIG. 14), FIGS. 13A and 14A are like FIGS. 13 and 14, but give dimensions (in inches) of one particular embodiment. The thread profile on the neck is not shown in this FIG. 14A, but in FIG. 14B, FIG. 13B shows an enlarged detail of a circled portion of FIG. 13A, FIG. 14B shows a typical neck thread section, FIG. 14C shows a typical section of the shoulder and "bumper roll" of FIG. 14A, FIG. 15 shows a cross-sectional side view illustrating possible crooked threading when a short plug is employed, FIGS. 16 and 17 are side views of alternative plug configurations, FIG. 18 is a cross sectional side view of a deskirted cap, FIGS. 19–22 illustrate another antitamper construction, FIG. 19 being a cross sectional side view of a portion of a cap, FIGS. 20 and 20A being cross sectional plan views of portions of neck and cap, FIG. 21 being a side view of a portion of the cap, and FIG. 22 being a cross sectional side view of a portion of the neck, FIG. 23 is a cross sectional side view of a portion of a two-part mold core for making the cap, FIGS. 24 to 28 are cross sectional side views of modified neck restraining configurations of the cap, FIGS. 29 to 31 illustrate a modified capping plate for use in transferring caps onto the bottle necks, FIG. 29 being a side view, partly in cross section, FIG. 30 being a side view at right angles to FIG. 20 showing the caps in the chute and FIG. 31 being a plan view partly in cross section, and FIG. 32 is a cross-sectional side view showing the domed upper wall of one preferred form of cap, not to scale, FIG. 33 is a schematic view of a plug-mouth relationship, FIG. 34 is a cross sectional side view of a modified plug.

FIGS. 1 to 8 are copies of FIGS. 2, 4, 6–10 and 12 of said Virog and Von Hagel patent, in which the injection-molded cap 11 has a top wall 12, a circular cylindrical internally threaded side wall 13 (preferably having external knurling or vertical ribbing such as serrations or grooves 14 (FIG. 2)) and, projecting from the bottom of the top wall, a thin circular sealing flange or plug 15 which is concentric with the side wall, and has a frusto-conical outer surface 16 for engaging an inwardly projecting thin circular lip 17 at the mouth 18 of the bottle 19, which mouth is located at the top of the neck 21 of the bottle. The cap 11 has two threads 23, 24, 180° out of phase, each thread making about ½ turn, and the bottle neck has two matching threads 26, 27. The two threads are of identical pitch; in the illustrated construction the pitch is about 3 turns per inch in contrast to the 6 turns per inch used for conventional single thread milk bottle caps so that the cap travels downward about ⅛ inch for each turn thereof. Preferably each thread on the bottle neck is entirely on one side of the bottle mold parting line 28. The plug 15 may have an inner annular face 30 substantially parallel to the vertical axis of the cap and plug. In FIG. 1 there is a substantially horizontal circular annular shoulder 31 at the base of the neck and the dimensions of the cap and bottle neck are such that, before the cap has made one half turn on the neck, further rotation of the cap is prevented by the engagement of the top wall 12 of the cap and the top 31A of the neck. There is an anti-tamper arrangement which includes a frangible hook means on the cap and a pair of hook-engageable elements situated 180° apart on the bottle. More specifically the hook-engageable elements comprise two identical upstanding lugs 32, 33 situated along the parting line 28 at opposite sides of the neck 21 and spaced a short distance from the neck, and the hook means comprises a tab 34 joined to the main body of the cap by at least one thin connector. In the drawing (FIGS. 2–4) there are three thin connectors 36, 37, 38, and the tab is a flat element which is narrow at its forward leading edge 39 and is tapered and widens gradually to a curved main section 41 of substantially uniform diameter which runs parallel to the circumference of the cylindrical cap wall 13 (said main section being defined by an inner edge 42 curved to conform substantially to the outer surface of the adjacent surface of the cap and a similarly curved outer edge 43 substantially parallel to that inner edge) and an outwardly projecting tail section 44 which is at an acute angle (e.g. a 45° angle) to said circumference.

In use, when the cap threads are first seated on the neck threads, the tab is out of engagement with a lug 32 or 33 except that a portion of the tab may rest lightly on top of one of the lugs, as shown in FIG. 2. On further rotation of the cap, the cap moves downward and the tab is now at a level to engage effectively the other lug;

thus the leading edge 39 of the tab enters the space between a lug (e.g. lug 32) and the cylindrical surface of the cap, as shown in FIGS. 3 and 5. Further rotation of the cap may force the lug to be tilted (as by movement of the wall which supports it) owing to the camming or wedging action of the taper of the tab as shown in FIG. 6 or the wedging force may cause the tab to tilt out of its normally horizontal position (as shown in FIG. 7) or both effects may occur at the same time. The lug itself may remain substantially unbent while the thin lug-supporting shoulder 31 is resiliently deformed to cause the lug to tilt. On still further rotation the tail 44 of the tab engages the lug so that the tail is bent inward and/or the tail and tab are twisted permitting the tail to pass through the space between lug and cap wall. At the end of the rotation the tail has moved past the lug and has snapped out behind it (FIG. 4), to thereafter act like a hook or barb with respect to that lug. Thus, when one attempts to unscrew the cap, the inner edge 46 of tail 44 is engaged by the lug thus forcing the tail outwards thereby breaking the frangible connections 36, 37, 38 so that the tab 34 is sheared completely off the main body of the cap, thus indicating to the customer that the cap has been unscrewed at least once.

In accordance with one aspect of this invention, the bottle mouth and cap structure described in the above-mentioned patent of Virog and Von Hagel are modified. One such modification is shown in FIG. 9 in which the neck 51 (above its threads 52, 53) has an inwardly directed portion (or lip) 54 which, unlike that in conventional milk bottles, is tapered (e.g., frusto-conically) at 54 (and may have a shallow inwardly directed edge or rim 56) for engagement with the plug 57 of the cap. For instance, the angle $\alpha$ of taper may be about 64° to the horizontal, the height A of the inwardly directed tapered portion 54 may be about 0.1 inch while the width B of the rim 56 may be about 0.045 inch. The dimensions of the plug 57 and tapered portion 54 and rim 56 are such that, when the bottle is fully capped the top of the tapered portion is preferably in contact (at its edge 56) with the upper generally cylindrical outer face 58 of the plug 57 (which cylindrical outer face is substantially parallel to the vertical axis of the cap and plug), as shown in FIG. 11A.

Unlike conventional caps, which have squared interior "corners" between their top and side walls, the cap 61 has a tapered or filleted internal corner 62 above its threads 63, 64. This, it is believed, acts to inhibit "stripping" of the threads which can occur for instance, during the bottle-capping step when the cap is rotated to thread it onto the bottle forcefully and the threads are wet with milk and threfore slippery. After the bottle has been fully capped, the continued application of the force in the capping direction causes the relatively rigid, solid, cap threads 63, 64 to press upwardly against the very flexible bottle threads 52, 53, thus tending to deform the neck. For some reason not fully understood, the presence of the fillet material 62 at the upper inner "corner" of the cap inhibits this deformation, possibly by restraining the tapered section 54 against changing in shape unduly under the influence of those neck-deforming forces. The action is believed to be as illustrated schematically in FIGS. 10 and 10A (relating to a non-tapered construction) and FIGS. 11 and 11A (relating to the construction of FIG. 9). FIGS. 10 and 11 show the parts just before the cap has been screwed on fully, while FIGS. 10A and 11A show them after screwing on has been completed and a strong screwing on force has been applied to the cap, resulting in downward pressure exerted by the top wall of the cap on the top of the bottle neck. As seen in FIG. 10A the bottle neck can partly crumple under that pressure, thus adversely affecting the seal between cap plug and bottle neck. In contrast, for the tapered structure the downward pressure exerted by the top wall of the cap is believed to have an effect similar to that observed with the well known conical washers; that is, the internal diameter at the top of the neck tends to decrease and the top of the neck thus grips the plug 57 more tightly. Meanwhile the presence of the corner fillet 62 tends to prevent crumpling of the neck or local out-of-round movement of portions of the top of the neck away from the corresponding portions of the plug; it backs up the tapered portion of the neck so as to resist such crumpling and substantially maintain the angle of the taper. In a preferred construction the space 66 available for the top of the neck between plug 57 and corner fillet 62 is such that the top of the neck is substantially restrained, all around its external circumference, against substantial outward movement so that substantially all of its internal circumference is kept in good sealing contact with the plug. It will be understood that (as mentioned in U.S. Pat. No. 4,098,419) the parts have thin walls and are subject to shrinkage after molding and their dimensions are not accurately controllable; thus, the mouths of the bottles are often somewhat out of round. In a typical case, the dimension indicated as "S" in FIG. 9 may be about 0.038 to 0.040 inch while the dimension "T" may be about 0.040 (or less) to 0.045 inch.

The filling at corner 62 increases the amount of plastic at the top of the cap. It is found that the bottom of the side walls of the cap may be made somewhat thinner, below the cap thrads; this not only reduces the amount of material needed to make the cap but (by providing a larger cap opening) makes it easier to start the capping operation properly. Thus the side wall thickness of the cap may be about 0.035 at the level of the cap threads and may average at about 0.025 below that level. The side wall may be tapered as shown at 71 in FIG. 12) below the threads.

It will be noted (FIG. 9) that a narrow portion 81 of the annular shoulder below the neck is horizontal, while the larger outer portion 82 of that shoulder has a tapered (e.g. frusto-conical) configuration (for instance, angle $\beta$ may be about 20°). This makes the shoulder more resistant to deformation under the downward forces which may be applied to the neck of the bottle during the capping operation. As a result, it stabilizes the position, and angle, of the lugs 86 with respect to the neck 51 and cap 61 during that operation.

A particularly preferred construction is illustrated in FIGS. 13 and 14. In that construction the structure at the corner of the cap has been modified to provide a plurality of spaced relatively thin spaced ribs 71 (e.g., about 0.05 inch thick) and a much shallower, solid fillet 72 to accomplish the desired effect with less material and thus lower cost (here the spaced ribs act, at a plurality of spaced points, to back up the tapered portion of the neck, so as to resist any tendency to crumple). To the same end, the upper outer corner 73 of the cap has been rounded off. Another preferred modification of the cap is the provision of a deeper and more gradually tapered plug 74 which, in the illustrated embodiment, extends downward such an extent that it is well within the mouth of the bottle at the start of thread engagement, when the threads of the cap and neck just start to engage (or, in other words, when the lowermost end 76 of a cap thread 63 moves just below the uppermost end 77 of a neck thread 64); in the illustrated embodiment about 3/5 of the depth of the plug is below the top of the neck at the start of thread engagement. It is found that the increase in the depth of the plug makes for a geometry in which it is impossible for the cap to be threaded crookedly onto the neck. When the shallower plug shown in FIG. 9 is used, careless threading can cause the cap to start screwing onto the neck at one of the dual threads while the other cap thread is completely out of engagement with its corresponding neck thread, as shown in FIG. 15; as seen in FIG. 15 even though the cap is not on straight that portion 78 of the shallow plug that is axially aligned with the engaged thread portion can begin to enter the mouth of the bottle. When the deeper plug shown in FIG. 13 is used that misalignment cannot occur because the plug cannot enter any part of the bottle mouth when the cap is threaded crookedly.

It will be understood that the plug need not be deep all around its circumference. Thus the cap may be made lighter by using a plug configuration 79 such as shown in FIG. 16 (having alternating deep portions 81 and shallow portions 82); or, less desirably as shown at 84 in FIG. 17, having two deep portions (or downwardly extending fingers) 86, 87 only at the two thread-starting areas of the cap, with the remainder of the plug being shallow.

The presently preferred dimensional relationships between plug and bottle mouth may be illustrated by cutting away the threaded skirt of the cap, leaving only the plug and the adjacent portion of the cap top wall (see FIG. 18). It is found that the plug generally fits easily into the mouth, simply by gravity (without application of any external force) to about half the depth of the plug. Applying a downward force causes expansion of the bottle mouth and, when the cap has reached a level where the rim 56 of the mouth is in contact with the non-expanding portion 58 of the plug, the de-skirted cap "snaps" into the mouth so snugly that one can propel the de-skirted cap a distance of well over 5 feet by holding the so-capped bottle horizontally and squeezing the bottle sharply with one's hands.

It appears that the tapered portion of the plug acts to expand the bottle mouth resiliently and that the mouth may even contract somewhat but still be resiliently pressing against the plug when the mouth comes into contact with the non-expanding, cylindrical, portion of the plug. The forces on the parts are not such that the plug engagement causes significant crowning of the cap (unlike FIG. 13 of U.S. Pat. No. 4,098,419). However the injection molding and post-molding shrinkage forces are such that the molded caps do have, in one preferred embodiment, a uniformly domed upper wall in which the domed portion appears to be within the circumference of the plug, as illustrated in FIG. 32. The thinness of the plastic upper wall is such that the dome can be flattened or even inverted by light pressure with one's thumb. This flexibility facilitates labelling the top of the cap in automatic machinery, since the cap top flattens easily in running under the pressure roller conventionally used for smoothing down the label.

As indicated in FIG. 13 the cap skirt has conventional serrations 88 for ease of turning. In a preferred construction the lower portion of the cap skirt has an unserrated thicker band 89 which strengthens it and gives a more pleasing appearance. The unserrated band also serves to indicate to the user that the cap should be grasped on the serrated portion, above the band, which helps to avoid rubbing the fingers against the lugs of the bottle.

Typical dimensions of the parts are indicated on FIGS. 13A, 13B, 14A, 14B and 14C. As noted in application Ser. No. 770,025, shrinkage occurs (particularly after blow molding) and it is not practicable to maintain precise dimensions. Thus the dimensions given are only a rough guide, based on one typical set of measurements. For instance the 1.358 inch neck diameter is the value measured on one bottle (along one diametral line); along another diametral line on the same bottle this diameter may be 1.345; the internal diameter of the portion of the mold from which that neck was formed was 1.390 inch. Again the mouth of the neck (whose internal diameter at the top is given as 1.228 inch) was formed by a "blow-pin" whose external diameter was 1.240 inch. The band (at the bottom of the cap skirt) whose internal and external diameters are given in FIGS. 13A as 1.458 and 1.525 inch was formed in a portion of the mold whose corresponding diameters were 1.480 inch (external diameter of mold core) and 1.565 inch (internal diameter of mold cavity).

The anti-tamper construction is like that shown in U.S. Pat. No. 4,098,419. The preferred cap construction uses a relatively small anti-tamper tab 91 integrally attached to band 89 by a single readily frangible integral connector 92 and more strongly attached by a connection like 36 (FIGS. 2 to 4) at its downstream end, so that on initial removal of the cap the connector 92 breaks, giving a readily visible indication that the bottle has been opened. Also the bottle mold is such that the lugs 94, 96 have smoothly rounded corners where they are likely to be engaged by the fingers of the user. Typically the tab 91 is about 0.5 inch long, the connector 92 is about 0.4 inch from the downstream connection and radial distance between the outside of the tail 44 (see FIGS. 2 to 4) and the band 89 is about 0.015 to 0.02 inch.

In an alternative anti-tamper construction the cap (FIGS. 19-21) has an internally directed tooth 101 adapted to engage a projecting tooth 102 (FIG. 22) on the bottle neck. When the cap and neck have a two-start thread (as preferred) constructed so that the cap can start in either one of two positions about 180° apart, there are two cap teeth 101 and two neck teeth 102 also about 180° apart. Each cap tooth is integral with a severable section 103 of the cap skirt (e.g., a portion of band 89); thus the severable section may be integrally joined to the rest of the skirt by at least one thinner, frangible boundary such as boundaries 104, 105. When the cap is screwed on, the teeth engage (as shown in FIG. 20) and the tooth 101 (and/or tooth 102) bends to permit the teeth to move past each other. When the cap is unscrewed the cap tooth 101 is forced against the neck tooth and is forced to pivot (as shown in FIG. 20A, breaking the frangible connection and giving a clear visual indication that the bottle has been opened. The neck teeth 102 are (like the lugs 33, 34, 86, 94, 96 of the previously illustrated embodiment) preferably situated along the parting line of the blow molded bottle or just to one side of that line.

The cap may be injection molded in conventional manner using a cooled mold cavity and a cooled core. The core is preferably made in two pieces 111 and 112 (FIG. 23) to reduce the machining needed to form the deep plug. The bottle may be blow-molded in conventional manner using a suitable "neck ring" as the mold for forming the neck to the illustrated configuration.

Instead of the combination of thin ribs 71 and fillet 72 one may use other constructions to restrain the top of the neck around the plug. For instance one may use a larger number of thicker ribs, without a fillet. One may dispense with the ribs and have a tapered corner as shown in FIG. 24; this tapered corner may have external ribs 74 (FIG. 25). The ribs and/or fillet may be replaced by a shallow internal skirt 116 (FIG. 26) whose inside wall is positioned to engage the outside of the top of the neck. Instead of a straight taper the taper may be curved or rounded, as illustrated in FIGS. 27 and 28. The overall angle (to the horizontal) of the inwardly directed portion of the top of the bottle should be at least about 30° to the horizontal, preferably more than 40° or 45° to the horizontal, e.g., about 60° to 70°.

I believe that the forces acting on the upper portion of the bottle neck are the upward force exerted on the neck thread by the cap thread and the downward force exerted by the top of the cap on the top of the neck. I believe that that upper neck portion tends (under these forces) to buckle or crumple locally resulting in a tendency of the threads to strip and the mouth-plug seal to gap. Having the upper neck portion at an appreciable angle as indicated (unlike to 0° or 10° angle used in prior art structures) helps to avoid that effect. This is especially the case when the cap is provided with means for restraining such buckling (such as the ribs 71 or the angled portion in FIG. 24) by backing up that upper portion at one or more points situated below the uppermost part of the neck, for substantially maintaining that angle. It is within the broader scope of the invention to use a smaller angle such as about 15° or 20°, in combination with a suitable buckling-restraining means; it is also within the broader scope of the invention to start the taper somewhat above the uppermost part of the neck thread. It will be noted that in the illustrated embodiment the ribs 71 are tapered at an angle slightly different from that of the upper neck portion; this provides space for the upper part of the neck thread to fit between the bottom of the ribs and the top of the cap thread; one may also use ribs or vanes tapered at the same angle as the upper neck portion but cut off at their lower portions to provide the thread space.

Another aspect of this invention which I believe to be novel is the provision of the non-expanding portion 58 of the tapered plug in a construction in which the dimensional relationships are such that screwing the cap down causes the mouth of the blow molded light weight milk bottle to expand around the tapered portion and then to seat resiliently on the non-expanding portion of the plug. The rim 56 has a short vertical inner surface (formed when the conventional blow pin used for used for blow molding is moved axially out of the mouth while the top of the bottle is restrained by the conventional shear steel); that surface does not have any parting line bead projecting inwardly therefrom and can seat snugly on the non-expanding portion of the plug, which aids in giving a good seal.

This invention provides a highly effective cap which may be very light weight and which can be produced very economically. Thus the cap weight may be below 2.4 grams, such as about 2.2 grams or less. Despite this low weight the cap gives an excellent seal, resistant to leaking.

One aspect of the invention relates to an apparatus and method for placing the caps on the bottles. The apparatus (see FIGS. 29 to 31) includes a conventional cap-feeding chute 121 down which the caps 122 travel one after the other under their own weight and at the bottom of which they are releasably retained (as by a pair of spring-pressed elements 123 biased toward the cap while the top wall 124 of the cap is engaged by one edge of a plate 126. As is conventional, the filled bottle to be capped is moved (as on a suitable moving endless conveyor, not shown) in a path such that the neck 127 of the bottle engages the bottom of the releasably held cap and moves further (in the direction shown by the arrow in FIG. 29) causing the cap to tilt and be released, to rest atop the bottle neck. As the cap and bottle are moved along, under the plate 126, the cap comes into contact with a conventional preturning element (such as a spring-biased arm 128 having serrations to engage the serrations of the cap) to rotate the cap on the neck in the direction it is to be screwed on so as to start the engagement of the threads of cap and neck. Thereafter the cap is acted upon by a conventional rotating capper (such as is illustrated in my U.S. Pat. No. 4,084,392 of Apr. 18, 1978). In conventional construction the plate (under which the cap and bottle pass) is stationary. In the improved construction illustrated here the plate 126 is mounted for vertical movement and is biased towards its lowermost position (being restrained against further movement by a suitable stop in its mounting). For use with the illustrated caps the construction is such that the plate is caused to rise about ⅛ inch (by contact with the cap) when the bottle and cap pass under it.

In one construction the horizontal plate 126 has secured thereto a thin vertical shoe 129 adapted to move in a guideway formed by the neck plate 131 of the cap chute 121 and by a pair of bars 132, 133 spaced from that back plate and fixed thereto (as by extensions 134). The capping plate is urged downward by a tension spring 136 attached to (a) an arm 137 extending from the top of shoe 129 and (b) the fixed bar 133. Downward movement of the capping plate 126 is limited by an adjustable stop (not shown). The spring is such that it takes a force of about 3 to 5 pounds to move the capping plate upward ⅛ inch (the spring is about 1½ inches long). The substitution of a movable capping plate for the conventional stationary plate avoids damage to the easily distorted top of the bottle neck which can result when a cap having (as preferred) a deep plug is pressed down against the bottle by passage under a stationary plate when the plug is not quite in alignment with the mouth of the bottle. It also avoids momentary (or permanent) distortion of the base of the bottle and consequent squirting out of some of the milk.

In the most preferred configuration the angle of the tapered portion of the plug is such, in relation to the angle of taper of the upper part of the neck, as to cause outward (and upward) movement of the mouth when the plug moves downward, as indicated in FIG. 33. It will be understood that the plug moves in a spiral or helical path dictated by the angle of the threads and that its horizontal rotary component of movement is larger than its vertical component. While the most preferred deep plug is shown as having a very gradual taper (e.g. about 6° to the vertical) along the portion in which it exerts its mouth-spreading action, it will be understood that other configurations may be used. For instance the plug may (as shown in FIG. 34) have a lower straight portion 141 (for entering the mouth and for insuring against crooked threading) and a mouth-spreading portion 142 at a relatively large angle (e.g. 45°) to the vertical.

While the cap and neck configuration have been illustrated with a two-start thread, it will be understood that it is within the broader scope of the invention to use a single start thread or to use a thread arrangement having more than two starts (e.g. 4 starts). Also other antitamper arrangements may be used such as locking ring arrangements, as shown for instance, in U.S. Pat. Nos. 3,504,818, 3,812,994 or 3,902,621 (with corresponding ratchet teeth on the bottle neck) or a ratcheted rim and lips arrangement as shown in instance in U.S. Pat. No. 3,805,987.

It is understood that the foregoing detailed description is given merely by way of illustration and that variations may be made therein without departing from the spirit of the invention.

I claim:
1. A combination of a blow molded plastic bottle and a plastic cap, comprising
   (a) a bottle neck having a mouth, an external screw thread below said mouth and an inwardly directed portion at said mouth,
   (b) said plastic cap adapted to be screwed onto said neck to cover said mouth and having an upper wall, a side wall with an internal thread corresponding to said external thread, and a downwardly directed circular plug for engaging said inwardly directed portion when said cap is screwed onto said neck and to form an anti-leak seal with said inwardly directed portion,
   (c) cooperating antitamper means on said cap and bottle and including a permanently deformable element, said antitamper means permitting said cap to be rotated in one direction to screw said cap onto said neck to bring said plug into sealing relation to said mouth and then preventing rotation in an unscrewing direction unless said element is visibly deformed.
   said inwardly directed portion having an inner surface and an outer surface, said inner and outer surface each extending upwardly and inwardly above said threads at an angle of at least about 30° to the horizontal,
   said plug having a circular outer surface for engaging said mouth, said outer surface of said plug being tapered to increase in diameter upwardly and to exert an outward force on said mouth and a corresponding inward force on said plug outer surface when said cap is screwed onto said neck.

2. A combination as in claim 1 in which said plug has a substantially untapered cylindrical outer surface above its tapered outer surface and adapted to be engaged by said mouth.

3. A combination as in claim 1 in which said cap has means surrounding the upper part of said plug for providing a space to receive the top of said neck and for restraining the top of said neck against substantial outward movement so as to keep said mouth in good sealing contact with said plug.

4. A combination as in claim 2 in which said cap has means surrounding the upper part of said plug for providing a space to receive the top of said neck and for restraining the top of said neck against substantial outward movement so as to keep said mouth in good sealing contact with said plug.

5. A combination as in claim 4 in which said surrounding and restraining means comprises an upwardly an inwardly extending portion at the inside of said cap.

6. A combination as in claim 1 in which said angle to the horizontal is in the range of about 45° to 70°.

7. A combination as in claim 6 in which the wall thickness of said bottle neck is about 0.02–0.03 inch and said cap is of molded plastic having an axial height of about ½ inch and an external diameter of about 1½ inches, the walls of said cap being so thin that said cap weighs less than about 2½ grams.

8. A combination as in claim 1 in which said inner and outer surfaces of said upwardly and inwardly extending portion are frusto-conical and make an angle of about 60° to 70° to the horizontal.

9. A combination as in claim 1 in which said cap is molded of a polyolefin plastic, has an axial height of about ½ inch and an external diameter of about 1½ inches and weighs less than about 2½ grams.

10. A combination as in claim 1 in which said threads are multiple-start threads comprising a plurality of external threads of identical pitch having effective portions substantially symmetrically disposed around the periphery of said neck and a plurality of internal threads of identical pitch having effective portions substantially symmetrically disposed around the internal periphery of said cap.

11. A combination as in claim 1 in which said plug is of such length as to extend into said mouth at the start of engagement of a cap thread and a neck thread and to be blocked by said mouth when said cap is in a position in which crooked threading would occur except for said blocking.

12. A combination as in claim 1 in which the wall thickness of said bottle neck is about 0.02 to 0.03 inch and said external thread is a bend in the wall of said neck and said neck thus has corresponding internal grooves, the diameter of said neck being about 1 to 2 inches.

13. A combination as in claim 1 in which said external thread is a bend in the wall of said neck and said neck thus has corresponding internal grooves, and the only substantial slope of said neck portion above said external thread is inward.

14. A combination of a blow molded plastic milk bottle and a plastic cap, comprising
   (a) a bottle neck having a mouth, an external screw thread below said mouth and an inwardly directed portion of said mouth,
   (b) said plastic cap adapted to be screwed onto said neck to cover said mouth and having an upper wall, a side wall with an internal thread corresponding to said external thread, and a downwardly directed circular plug for engaging said inwardly directed portion when said cap is screwed onto said neck and to form an anti-leak seal with said inwardly directed portion,
   (c) cooperating antitamper means on said cap and bottle and including a permanently deformable element, said antitamper means permitting said cap to be rotated in one direction to screw said cap onto said neck to bring said plug into sealing relation to said mouth and then preventing rotation in an unscrewing direction unless said element is visibly deformed,
   said inwardly directed portion extending upwardly and inwardly above said threads at an angle of at least about 30° to the horizontal,
   said plug having a circular outer surface for engaging said mouth, said outer surface being tapered to increase in diameter upwardly and to exert an outward force on said mouth and a corresponding inward force on said surface when said cap is screwed onto said neck, said cap having means surrounding the upper part of said plug for providing a space to receive the top of said neck and for restraining the top of said neck against substantial outward movement so as to keep said mouth in good sealing contact with said plug, said surrounding and restraining means comprising spaced ribs at the upper inner corner of said cap.

15. A combination as in claim 14 in which said surrounding and restraining means comprises spaced ribs at the upper inner corner of said cap and an upwardly and inwardly extending fillet at said corner.

16. A molded plastic cap, for use with a blow molded plastic bottle having a neck, said neck having a mouth, an external screw thread below said mouth and an inwardly directed portion at said mouth, said plastic cap adapted to be screwed onto said neck to cover said mouth and having an upper wall, a cylindrical side wall with an internal thread corresponding to said external thread for engaging said external thread, and a downwardly directed circular plug for engaging said inwardly directed portion, when said cap is screwed onto said neck, and to form an antileak seal with said inwardly directed portion, said cap having antitamper means for cooperating with means on said bottle and including a permanently deformable element, said antitamper means permitting said cap to be rotated in one direction to screw said cap onto said neck to bring said plug into sealing relation to said mouth and then preventing rotation in an unscrewing direction unless said element is visibly deformed, said cap having upwardly and inwardly extending means at the inside of said cap above said internal thread for providing a space to receive the top of said neck and for restraining the top of said neck against substantial outward movement so as to keep said mouth in good sealing contact with said plug, said cap being molded of a polyolefin plastic, having an axial height of about ½ inch and an external diameter of about 1½ inches, the walls of said cap being so thin that said cap weighs less than about 2½ grams.

17. A molded plastic cap, for use with a blow molded plastic bottle having a neck, said neck having a mouth, an external screw thread below said mouth and an inwardly directed portion at said mouth, said plastic cap adapted to be screwed onto said neck to cover said mouth and having an upper wall, a side wall with an internal thread corresponding to said external thread, and a downwardly directed circular plug for engaging said inwardly directed portion, when said cap is screwed onto said neck, and to form an anti-leak seal with said inwardly directed portion, said cap having antitamper means for cooperating with means on said bottle and including a permanently deformable element, said antitamper means permitting said cap to be rotated in one direction to screw said cap onto said neck to bring said plug into sealing relation to said mouth and then preventing rotation in an unscrewing direction unless said element is visibly deformed, said cap having upwardly and inwardly extending means at the inside of said cap for providing a space to receive the top of said neck and for restraining the top of said neck against substantial outward movement so as to keep said mouth in good sealing contact with said plug, said upwardly and inwardly extending means comprising spaced ribs at the upper inner corner of said cap.

18. A cap as in claim 17 in which said upwardly and inwardly extending means also comprises an upwardly and inwardly extending fillet at said upper inner corner.

19. A blow molded plastic milk bottle having a neck, said neck having a mouth, an external screw thread below said mouth and an inwardly directed portion at said mouth, the wall thickness of said neck being about 0.02–0.03 inch, said neck being adapted to be capped by an internally threaded plastic cap having a downwardly directed circular plug for engaging said inwardly directed portion when said cap is screwed onto said neck, and to form an antileak seal with said inwardly directed portion, said inwardly directed portion having an inner surface and an outer surface, said inner and outer surfaces each extending upwardly and inwardly in frusto-conical form above said threads at an angle of at least about 30° to the horizontal.

20. A bottle as in claim 19 in which said frusto-conical form makes an angle of about 60° to 70° to the horizontal.

21. A combination of a blow molded plastic milk bottle and a plastic cap, comprising
(a) a bottle neck having a mouth, an external screw thread below said mouth and an inwardly directed portion at said mouth,
(b) said plastic cap adapted to be screwed onto said neck to cover said mouth and having an upper wall, a side wall with an internal thread corresponding to said external thread, and a downwardly directed circular plug for engaging said inwardly directed portion when said cap is screwed onto said neck and to form an anti-leak seal with said inwardly directed portion,
(c) cooperating antitamper means on said cap and bottle and including a permanently deformable element, said antitamper means permitting said cap to be rotated in one direction to screw said cap onto said neck to bring said plug into sealing relation to said mouth and then preventing rotation in an unscrewing direction unless said element is visibly deformed, said inwardly directed portion extending upwardly and inwardly above said threads at an angle of at least about 15° to the horizontal, said plug having a circular outer surface for engaging said mouth, said outer surface being tapered to increase in diameter upwardly and to exert an outward force on said mouth and a corresponding inward force on said surface when said cap is screwed onto said neck, said plug having means for backing up said inwardly and upwardly directed portion at a plurality of points situated below the uppermost part of the neck for substantially maintaining said angle.

22. A combination as in claim 21 in which said plug has a substantially untapered cylindrical outer surface above its tapered outer surface and adapted to be engaged by said mouth.

23. A combination as in claim 21 in which said cap has means surrounding the upper part of said plug for providing a space to receive the top of said neck and for restraining the top of said neck against substantial outward movement so as to keep said mouth in good sealing contact with said plug.

24. A combination as in claim 21 in which said cap is molded of a polyolefin plastic, has an axial height of about ½ inch and an external diameter of about 1½ inches and weighs less than about 2½ grams.

25. A combination of a blow molded plastic milk bottle and a plastic cap, comprising
    (a) a bottle neck having a substantially circular mouth, an external screw thread below said mouth and an inwardly directed portion at said mouth,
    (b) said plastic cap adapted to be screwed onto said neck to cover said mouth and having an upper wall, a side wall with an internal thread corresponding to said external thread, and a downwardly directed circular plug for engaging said inwardly directed portion when said cap is screwed onto said neck and to form an anti-leak seal with said inwardly directed portion,
    (c) cooperating antitamper means on said cap and bottle and including a permanently deformable element, said antitamper means permitting said cap to be rotated in one direction to screw said cap onto said neck to bring said plug into sealing relation to said mouth and then preventing rotation in an unscrewing direction unless said element is visibly deformed,
    said plug having a circular outer surface for engaging said mouth, said outer surface being tapered to increase in diameter upwardly and to exert an outward force on said mouth and a corresponding inward force on said surface when said cap is screwed onto said neck,
    said plug having a substantially untapered cylindrical outer surface above its tapered outer surface and adapted to be engaged by said mouth,
    the dimensional relationships being such that screwing on the cap causes said mouth to expand resiliently around said tapered portion of said plug and then to seat resiliently on said substantially untapered cylindrical surface of said plug.

26. A combination as in claim 25 in which said inwardly directed portion at said mouth extends upwardly and inwardly above said neck threads at an angle of at least about 15° to the horizontal.

27. A combination as in claim 26 in which said angle is about 45° to 70°

28. A combination as in claim 27 in which the wall thickness of said bottle neck is about 0.02 to 0.03 inch and said external thread is a bend in the wall of said neck and said neck thus has corresponding internal grooves, said cap is molded of plastic and has an axial height of about ½ inch and an external diameter of about 1½ inches, the walls of said cap being so thin that said cap weighs less than about 2½ grams, said cap having spaced ribs at its uper inner corner for surrounding and restraining the top of said neck against substantial outward movement so as to keep said mouth in good sealing contact with said plug, said plug being of such length as to extend into said mouth at the start of engagement of a cap thread and a neckthread and to be blocked by said mouth when said cap is in a position in which crooked threading would occur except for said blocking.

29. A combination as in claim 25 in which said inwardly directed portion at said mouth extends substantially horizontally.

30. A combination of a blow molded plastic milk bottle and a plastic cap, comprising
    (a) a bottle neck having a substantially circular mouth, an external screw thread below said mouth and an inwardly directed portion at said mouth,
    (b) said plastic cap adapted to be screwed onto said neck to cover said mouth and having an upper wall, a side wall with an internal thread corresponding to said external thread, and a downwardly directed circular plug for engaging said inwardly directed portion when said cap is screwed onto said neck and to form an anti-leak seal with said inwardly directed portion,
    said plug having a circular outer surface for engaging said mouth, said outer surface being tapered to increase in diameter upwardly and to exert an outward force on said mouth and a corresponding inward force on said surface when said cap is screwed onto said neck,
    said plug having a substantially untapered cylindrical outer surface above its tapered outer surface and adapted to be engaged by said mouth,
    the dimensional relationships being such that screwing on the cap causes said mouth to expand resiliently around said tapered portion of said plug and then to seat resiliently on said substantially untapered cylindrical surface of said plug,
    said inwardly directed portion at said mouth extending upwardly and inwardly above said neck threads at an angle of at least about 15° to the horizontal.

31. A combination as in claim 30 in which said angle is about 45° to 70°.

32. A combination as in claim 31 in which said cap has means surrounding the upper part of said plug, for providing a space to receive the top of said neck and for restraining the top of said neck against substantial outward movement so as to keep said mouth in good sealing contact with said plug.

33. A combination as in claim 32 in which the wall thickness of said bottle neck is about 0.02 to 0.03 inch and said external thread is a bend in the wall of said neck and said neck thus has corresponding internal grooves.

34. a combination as in claim 33 in which said surounding and restraining means comprises an upwardly and inwardly extending portion at the inside of said cap above said neck thread-engaging external thread.

35. A combination as in claim 34 in which said surrounding and restraining means comprises spaced ribs at the upper inner corner of said cap.

36. A combination as in claim 34 in which said surrounding and restraining means comprises spaced ribs at the upper inner corner of said cap and an upwardly and inwardly extending fillet at said corner.

37. A combination as in claim 36 in which said plug is of such length as to extend into said mouth at the start of engagement of a cap thread and a neck thread and to be blocked by said mouth when said cap is in a position in which crooked threading would occur except for said blocking.

38. A combination as in claim 37 in which said cap is molded of a polyolefin plastic, has an axial height of about ½ inch and an external diameter of about 1½ inches, the walls of said cap being so thin that said cap weighs less than about 2½ grams.

* * * * *